United States Patent
Maitra et al.

(10) Patent No.: US 12,437,510 B2
(45) Date of Patent: Oct. 7, 2025

(54) UTILIZING MACHINE LEARNING MODELS TO IDENTIFY IMPLICIT BIAS

(71) Applicant: Accenture Global Solutions Limited, Dublin (IE)

(72) Inventors: Anutosh Maitra, Bangalore (IN); Milind Savagaonkar, Bangalore (IN); Sowmya Rasipuram, Bangalore (IN); Roshni Ramesh Ramnani, Bangalore (IN); Karthik L Nagar, Shivamogga (IN); Aditya Mohan Singh, Halanayakanahalli (IN)

(73) Assignee: Accenture Global Solutions Limited, Dublin (IE)

( * ) Notice: Subject to any disclaimer, the term of this patent is extended or adjusted under 35 U.S.C. 154(b) by 451 days.

(21) Appl. No.: 18/068,945

(22) Filed: Dec. 20, 2022

(65) Prior Publication Data

US 2024/0203094 A1 Jun. 20, 2024

(51) Int. Cl.
*G06V 10/764* (2022.01)
*G06V 10/70* (2022.01)
*G06V 10/774* (2022.01)
*G10L 15/26* (2006.01)

(52) U.S. Cl.
CPC .......... *G06V 10/764* (2022.01); *G06V 10/768* (2022.01); *G06V 10/774* (2022.01); *G10L 15/26* (2013.01)

(58) Field of Classification Search
CPC .. G06V 10/764; G06V 10/768; G06V 10/774; G06V 10/82; G06V 30/10; G10L 15/26
USPC .......................................................... 382/100
See application file for complete search history.

(56) References Cited

U.S. PATENT DOCUMENTS

| | | | |
|---|---|---|---|
| 2022/0392434 A1* | 12/2022 | Asi | G10L 15/063 |
| 2023/0316003 A1* | 10/2023 | Friedman | G06N 3/0442 704/9 |
| 2025/0103811 A1* | 3/2025 | Riley | G06F 16/958 |

OTHER PUBLICATIONS

Dansby et al., "AI advances to better detect hate speech," MetaAI, May 12, 2020, 12 Pages.
Benitez-Andrades et al., "Detecting racism and xenophobia using deep learning models on Twitter data: CNN, LSTM and BERT," PEERJ Computer Science, Published Mar. 1, 2022, 24 Pages.
Miao et al., "Detecting Offensive Language on Social etworks: An End-to-end Detection Method based on Graph Attention Networks," Journal of J/21T£X Templates, Mar. 4, 2022, 14 Pages.

(Continued)

*Primary Examiner* — Charlotte M Baker
(74) *Attorney, Agent, or Firm* — Polsinelli PC

(57) ABSTRACT

A device may receive multimodal content that includes two or more of text data, image data, or video data, and may process the two or more of the text data, the image data, or the video data, with a binary classifier model, to determine whether the two or more of the text data, the image data, or the video data is biased or unbiased. The device may process the two or more of the text data, the image data, or the video data, with a multilabel classifier model and based on the two or more of the text data, the image data, or the video data being biased, to determine an implicit bias in at least one of the two or more of the text data, the image data, or the video data, and may perform one or more actions based on the implicit bias.

18 Claims, 14 Drawing Sheets

(56) References Cited

OTHER PUBLICATIONS

Xu et al., "Hate Speech and Offensive Content Identification Based on Self-Attention," CEUR Workshop Proceedings, Forum for information Retrieval Evaluation, Dec. 13-17, 2021, India, 7 Pages.

Mitra et al., "Multilingual Hate Speech and Offensive Content Detection using Modified Cross-entropy Loss," CEUR Workshop Proceedings, Feb. 5, 2022, 8 Pages.

Wang et al., "YNU_wb at HASOC 2019: Ordered Neurons LSTM with Attention for Identifying Hate Speech and Offensive Language," CEUR Workshop Proceedings, vol. 2517, 2019, 8 Pages.

Raj et al., "An Application to Detect Cyberbullying Using Machine Learning and Deep Learning Techniques," SN Computer Science, vol. 3, No. 401, 2022, 13 pages.

Singh et al., "Hollywood Identity Bias Dataset: A Context Oriented Bias Analysis of Movie Dialogues," Proceedings of the 13th Conference on Language Resources and Evaluation, Marseille, Jun. 20-25, 2022, 12 Pages.

\* cited by examiner

UTILIZING MACHINE LEARNING MODELS TO IDENTIFY IMPLICIT BIAS

BACKGROUND

Multimodal content may include content with two or more types of content (e.g., textual content, video content, audio content, image content, and/or the like). Content has an enormous impact on society. Fair and impartial representation of all people and communities is needed for content to be accepted as inclusive and responsible in today's society.

SUMMARY

Some implementations described herein relate to a method. The method may include receiving multimodal content that includes two or more of text data, image data, or video data, and processing the two or more of the text data, the image data, or the video data, with a binary classifier model, to determine whether the two or more of the text data, the image data, or the video data is biased or unbiased. The method may include processing the two or more of the text data, the image data, or the video data, with a multilabel classifier model and based on the two or more of the text data, the image data, or the video data being biased, to determine an implicit bias in at least one of the two or more of the text data, the image data, or the video data, and performing one or more actions based on the implicit bias.

Some implementations described herein relate to a device. The device may include one or more memories and one or more processors coupled to the one or more memories. The one or more processors may be configured to receive multimodal content, and process the multimodal content, with a binary classifier model, to determine whether the multimodal content is biased or unbiased. The one or more processors may be configured to process the multimodal content, with a multilabel classifier model and based on the multimodal content being biased, to determine an implicit bias in at least one of the two or more of the text data, the image data, or the video data, and perform one or more actions based on the implicit bias.

Some implementations described herein relate to a non-transitory computer-readable medium that stores a set of instructions for a device. The set of instructions, when executed by one or more processors of the device, may cause the device to receive multimodal content that includes two or more of text data, image data, or video data, and process the two or more of the text data, the image data, or the video data, with a binary classifier model, to determine whether the two or more of the text data, the image data, or the video data is biased or unbiased, where the binary classifier model includes a bidirectional encoder representations from transformers model. The set of instructions, when executed by one or more processors of the device, may cause the device to process the two or more of the text data, the image data, or the video data, with a multilabel classifier model and based on the two or more of the text data, the image data, or the video data being biased, to determine an implicit bias in at least one of the two or more of the text data, the image data, or the video data, where the multilabel classifier model includes a bidirectional auto-regressive transformers model. The set of instructions, when executed by one or more processors of the device, may cause the device to perform one or more actions based on the implicit bias.

DETAILED DESCRIPTION

Figure 1A:
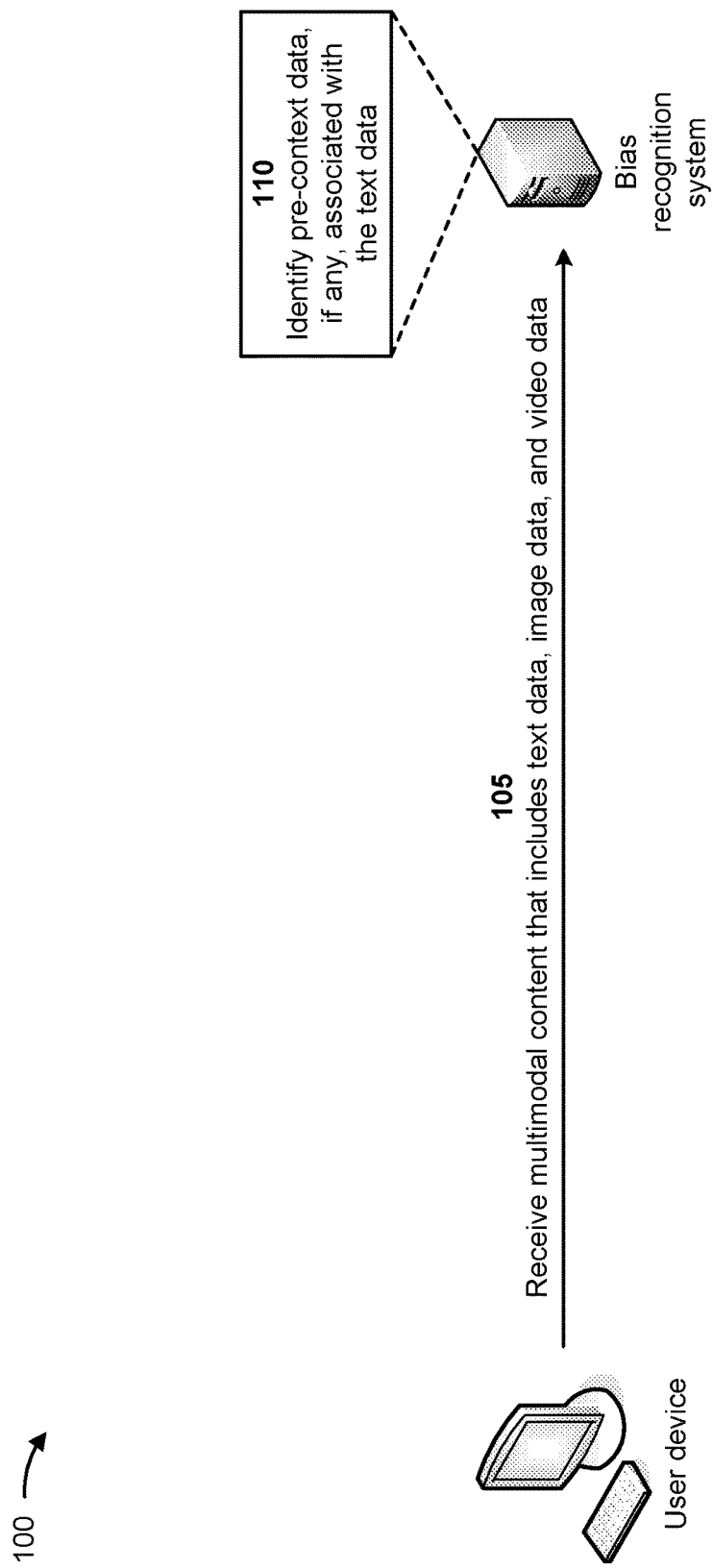
FIGS. 1A-1J are diagrams of an example implementation described herein.

The following detailed description of example implementations refers to the accompanying drawings. The same reference numbers in different drawings may identify the same or similar elements.

Biased content may be more subtle and nuanced than other kinds of undesirable content, such as hate speech, false news, violent content, and/or the like. As a result, current techniques for detecting such undesirable content may be unable to detect bias. Bias and hate speech are often related (e.g., bias can generate hate speech). Bias, however, may not necessarily generate hate speech, and hate may be expressed universally, without any bias toward a single person or a community. There are numerous examples where unbridled bias is expressed without any iota of hate involved in an expression. Bias can be expressed with or without the presence of speech or textual content. Often bias is implicit and difficult to detect without understanding a "sense" of an entire content.

Biased or prejudiced representation of a person or a group of people in content may distort a perception of an entity associated with the content, may cause societal damage, may result in lost business for the entity, and/or the like. Bias and/or undesirable content may be subconsciously added during content creation and may not be identified until after the content is made public. Current techniques for identifying bias in content focus mostly on textual content, and fail to identify bias in multimodal content. For example, current techniques analyze different types of multimodal content differently and then attempt to make an assessment on bias based on the different analyses. This often leads to an incorrect identification of bias in multimodal content. Bias in multimodal content may be identified when information obtained from one source (e.g., text) is put in association with information obtained from another source (e.g., an image). The two sets of information when processed individually might sound innocuous and unbiased and a "sense" of the content may not be captured in this manner. Therefore, current techniques for identifying bias in content consume computing resources (e.g., processing resources, memory resources, communication resources, and/or the like), networking resources, and/or the like associated with providing an incorrect identification of bias in content, failing to properly identify bias in multimodal content, handling customer complaints due to bias not properly identified in multimodal content, handling lost business (e.g., via a marketing campaign, providing rebates to customers, and/or the like) due to bias not properly identified in multimodal content, and/or the like.

Some implementations described herein relate to a bias recognition system that utilizes machine learning models to identify implicit bias in multimodal content. For example, the bias recognition system may receive multimodal content that includes text data, image data, and video data, and may identify pre-context data associated with the text data. The bias recognition system may process the text data and the pre-context data, with a binary classifier model, to determine whether the text data or the pre-context data is biased or unbiased, and may process the text data and the pre-context data, with a multilabel classifier model and based on the text data or the pre-context data being biased, to determine an implicit text bias. The bias recognition system may utilize a plurality of image models to identify image tag line data, image caption data, and image attribute data in the image data, and may process the image tag line data, the image caption data, and the image attribute data, with the binary classifier model, to determine whether the image data is biased or unbiased. The bias recognition system may process the image tag line data, the image caption data, and the image attribute data, with the multilabel classifier model and based on the image data being biased, to determine an implicit image bias, and may utilize a plurality of video models to identify video tag line data, video caption data, video attribute data, video transcript data, and video action recognition data in the video data. The bias recognition system may process the video tag line data, the video caption data, the video attribute data, the video transcript data, and the video action recognition data, with the binary classifier model, to determine whether the video data is biased or unbiased, and may process the video tag line data, the video caption data, the video attribute data, the video transcript data, and the video action recognition data, with the multilabel classifier model and based on the video data being biased, to determine an implicit video bias. The bias recognition system may perform one or more actions based on the implicit text bias, the implicit image bias, and/or the implicit video bias.

In this way, the bias recognition system utilizes machine learning models to identify implicit bias in multimodal content. Implicit bias is a form of bias that occurs unconsciously and unintentionally, and that nevertheless affects judgments, decisions, and behaviors. The bias recognition system may utilize machine learning models that provide a natural language understanding of text data, image and attribute extraction of image data, and computer vision techniques (e.g., facial recognition, emotion detection, object detection, computational aesthetics, and/or the like) of video data to identify bias (e.g., implicit bias) in multimodal content. The bias recognition system may utilize a multitask classifier model, that is trained with textual utterances, to detect bias and a nature of the bias in multimodal content. The bias recognition system may create a textual representation of the content (e.g., image and videos). The bias recognition system may identify text embedded in an image as "text," may identify an image caption as "image pre-context," may identify a tag line as "text," and may identify a video caption or a transcript as "video pre-context." This, in turn, conserves computing resources, networking resources, and/or the like that would otherwise have been consumed in providing an incorrect identification of bias in content, failing to properly identify bias in multimodal content, handling customer complaints due to bias not properly identified in multimodal content, handling lost business due to bias not properly identified in multimodal content, and/or the like.

FIGS. 1A-1J are diagrams of an example 100 associated with utilizing machine learning models to identify implicit bias in multimodal content. As shown in FIGS. 1A-1J, example 100 includes a bias recognition system associated with a user device. The bias recognition system may include a system that utilizes machine learning models to identify implicit bias in multimodal content. Further details of the bias recognition system and the user device are provided elsewhere herein.

As shown in FIG. 1A, and by reference number 105, the bias recognition system may receive multimodal content that includes text data, image data, and video data. For example, a user may utilize the user device to create multimodal content that includes one or more of text data, image data, video data, audio data, and/or the like. The multimodal content may include a dialogue (e.g., a movie script), a poster (e.g., an advertising poster), a short scene (e.g., an advertisement), textual content (e.g., a marketing or corporate communication), and/or the like. The user may wish to determine whether the multimodal content is biased, and, if determined to be biased, a type or types of implicit bias associated with the multimodal content. The user may utilize the user device to generate a request to review the multimodal content, and may cause the user device to provide the request and the multimodal content to the bias recognition system. The bias recognition system may receive the request and the multimodal content from the user device. The bias recognition system may analyze the multimodal content based on the request and as described below.

As further shown in FIG. 1A, and by reference number 110, the bias recognition system may identify pre-context data, if any, associated with the text data. For example, the text data of the multimodal content may include pre-context data, such as hash tags in social media, a topic of an online post, previous dialog, and/or the like. In some implementations, the text data may not include pre-context data. In some implementations, the bias recognition system may analyze source code of the text data (e.g., source code of a web page), and may identify the pre-context data of the text data based on analyzing the source code of the text data.

Figure 1B:
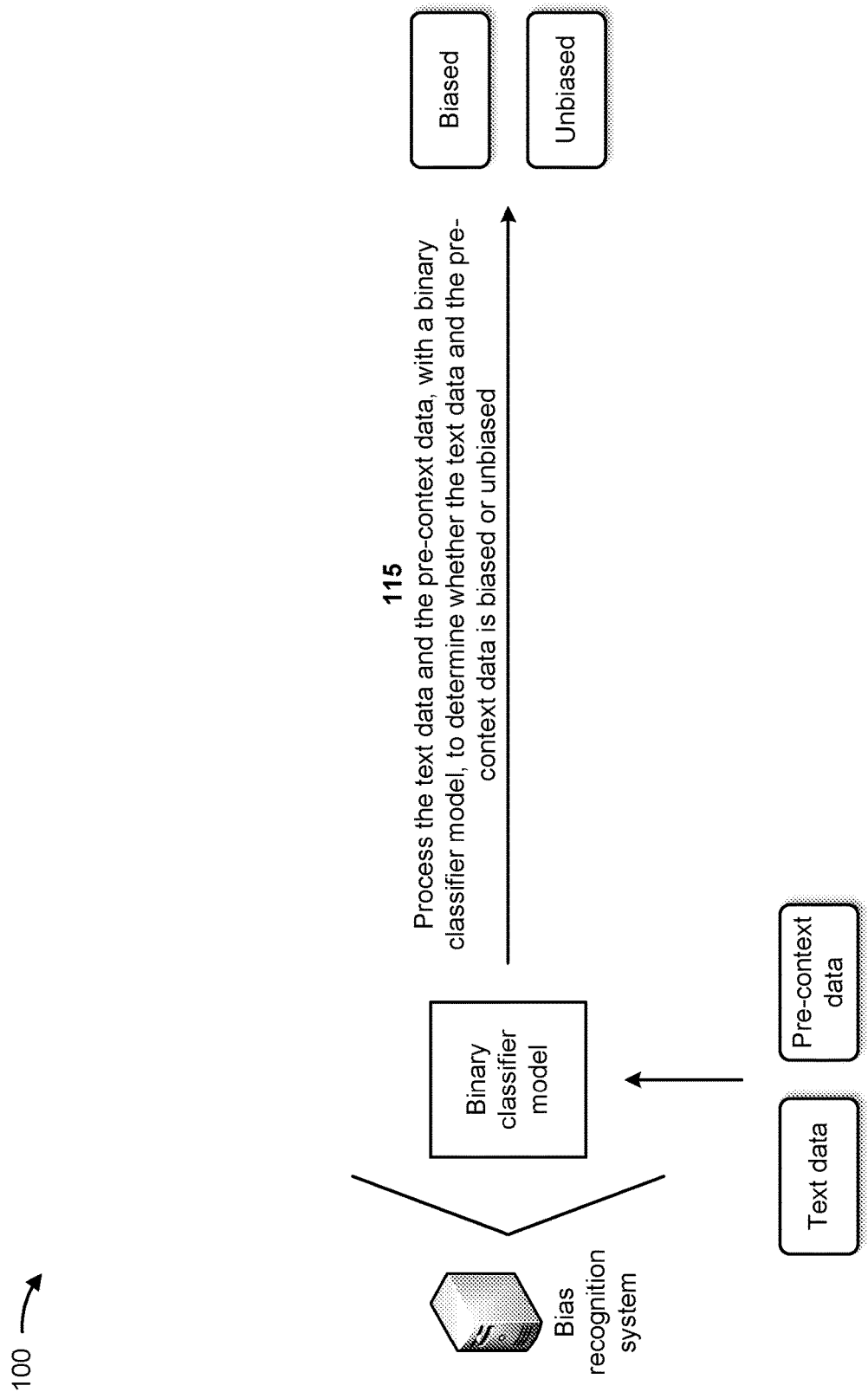

As shown in FIG. 1B, and by reference number 115, the bias recognition system may process the text data and the pre-context data, with a binary classifier model, to determine whether the text data and/or the pre-context data is biased or unbiased. For example, the bias recognition system may include a binary classifier model, such as a bidirectional encoder representations from transformers (BERT)-based binary classifier model, that processes the text data and the pre-context data (e.g., if present). The BERT-based binary classifier model may receive the text data and the pre-context data, and may generate position embeddings and token embeddings based on the text data and the pre-context data. The BERT-based binary classifier model may process the position embeddings and the token embeddings, with a multiple layer (e.g., twelve layer) BERT model that includes a feed forward network and a self-attention layer, to generate contextual embeddings. The BERT-based binary classifier model may process the contextual embeddings, with a linear layer and then with a softmax layer, to generate a classification for the text data and the pre-context data. The classification may include an indication of whether the text data and/or the pre-context data is biased or unbiased (e.g., neutral). If the BERT-based binary classifier model determines that the text data and the pre-context data is unbiased, the bias recognition system may provide, for display, information indicating that the text data and the pre-context data of the multimodal content are unbiased.

In some implementations, the bias recognition system may train the binary classifier model with textual data (e.g., utterances) that is annotated based on a scientifically-established annotation process. For example, the bias recognition system may utilize contextual, social, and temporal perspectives to label the textual utterances. In some implementations, another system may train the binary classifier model, with the textual data, to generate a trained binary classifier model, and may provide the trained binary classifier model to the bias recognition system. In such implementations, the bias recognition system may provide the textual data to the other system for training the binary classifier model.

Figure 1C:
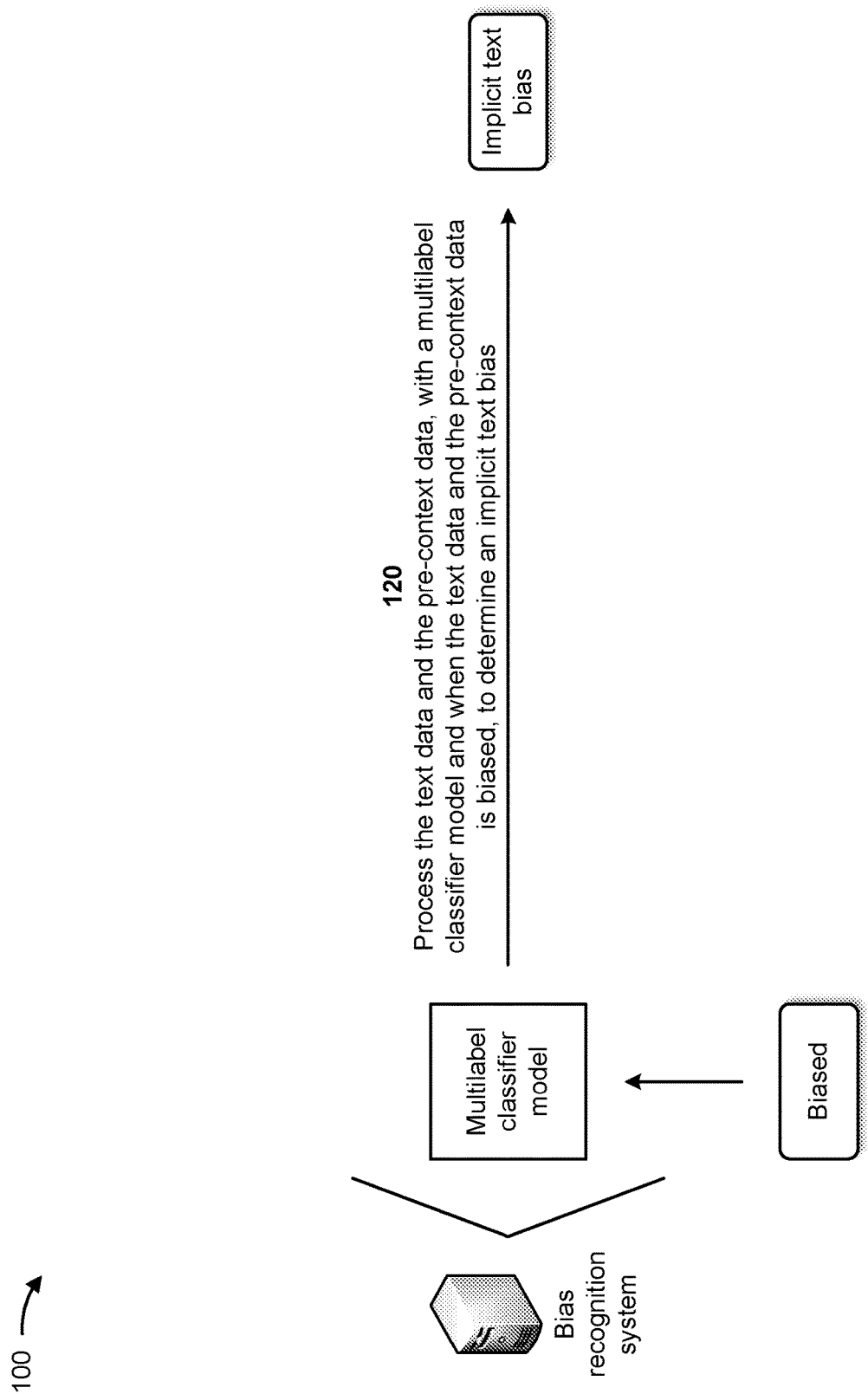

As shown in FIG. 1C, and by reference number 120, the bias recognition system may process the text data and the pre-context data, with a multilabel classifier model and when the text data and the pre-context data is biased, to determine an implicit text bias. For example, the bias recognition system may include a multilabel classifier model, such as bidirectional auto-regressive transformers (BART)-based multilabel classifier model, that processes the text data and the pre-context data (e.g., if present) when the BERT-based binary classifier model determines that the text data and/or the pre-context data is biased. The BART-based multilabel classifier model may receive the text data and the pre-context data, and may generate position embeddings and token embeddings based on the text data and the pre-context data. The BART-based multilabel classifier model may process the position embeddings and the token embeddings, with a multiple layer (e.g., twelve layer) BART model that includes a feed forward network and a self-attention layer, to generate contextual embeddings. The BART-based multilabel classifier model may process the contextual embeddings, with a linear layer and then with a binary cross entropy layer, to determine one or more implicit text biases associated with the text data and/or the pre-context data. The implicit text biases may be associated with an age bias, a gender bias, a race bias, a religious bias, a sexuality bias, an occupational bias, a physical appearance bias, and/or the like. In some implementations, the BART-based multilabel classifier model may identify implicit, nuanced, and subtle biases in any form of content (e.g., text, speech, image, video, audio, and/or a combination of the aforementioned).

In some implementations, the bias recognition system may train the multilabel classifier model with textual data (e.g., utterances) that is annotated based on a scientifically-established annotation process. For example, the bias recognition system may utilize contextual, social, and temporal perspectives to label the textual utterances. In some implementations, another system may train the multilabel classifier model, with the textual data, to generate a trained multilabel classifier model, and may provide the trained multilabel classifier model to the bias recognition system. In such implementations, the bias recognition system may provide the textual data to the other system for training the multilabel classifier model.

Figure 1D:
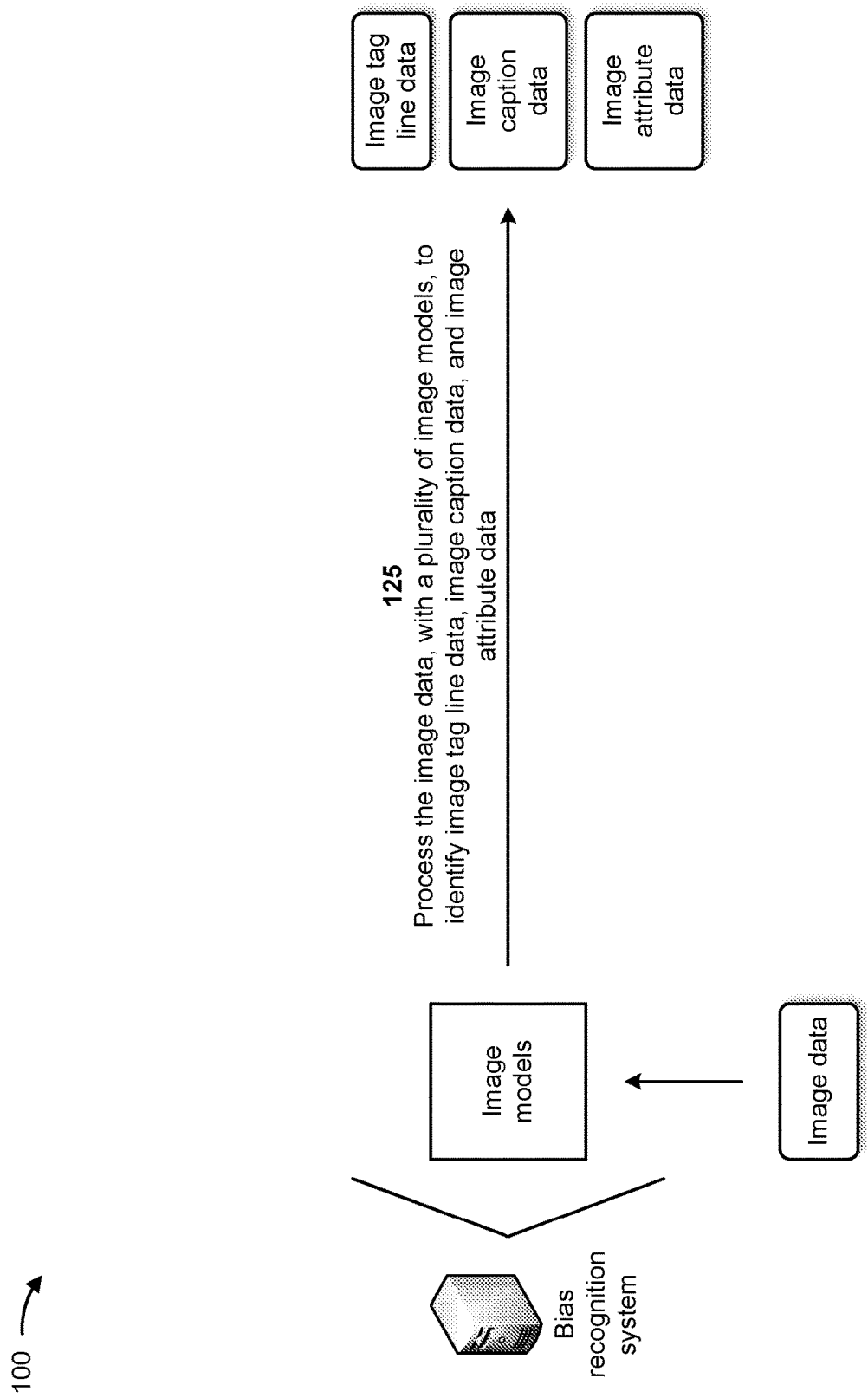

As shown in FIG. 1D, and by reference number 125, the bias recognition system may process the image data, with a plurality of image models, to identify image tag line data, image caption data, and image attribute data. For example, the image data may include image tag line data (e.g., actual text in an image), image caption data (e.g., identifying an event in an image, such as "a woman riding a red scooter"), and image attribute data (e.g., identifying attributes of characters present in an image, such as "a white female 25-32 years of age"). The bias recognition system may utilize different image models to identify the image tag line data, the image caption data, and the image attribute data.

In some implementations, the bias recognition system may utilize a Paddle optical character recognition (OCR) model to identify the image tag line data in the image data. The Paddle OCR model may include a one-dimensional convolutional neural network (CNN) model with a connectionist temporal classification (CTC) loss function. The Paddle OCR model may include an OCR framework or toolkit that provides multilingual practical OCR tools that help users to apply and train different models in a few lines of code. The Paddle OCR model may include a text detection model, a text direction classifier model, and a text recognition model. The text detection model may include a single shot arbitrarily shaped text (SAST) detector that utilizes context attention multitask learning based on fully connected networks to learn geometric representations of text regions in the image data. The Paddle OCR model may include a context attention block (CAB) that learns sequential long range dependencies of pixel information in the image data.

In some implementations, the bias recognition system may utilize a transformer-based model to identify the image caption data in the image data. Image captioning is a method that describes an image syntactically and semantically by recognizing context and relating different objects present in the image. The task of image captioning is basically an image-to-sequence problem where inputs (e.g., pixels) are encoded as feature vectors in a visual encoding step that prepares the inputs for a language generation step. The transformer-based model may include a visual transformer encoding model that divides an image into multiple patches, linearly embeds the multiple patches to generate multiple patch embeddings, adds position embeddings to the multiple patch embeddings, and processes the position and multiple patch embeddings with a transformer encoder. The transformer-based model may include a transformer-based language generator model that generates the image caption data via masked self-attention over previously-generated tokens and cross attention with encoded visual features. In some implementations, the transformer-based model may include a visual conditional generative pretrained transformer (VC GPT) model that identifies the image caption data in the image data. The VC GPT model may utilize a contrastive language-image pretraining visual transformer model (CLIP ViT) as an encoder and may utilize a pretrained GPT2 language model as a decoder to insert domain knowledge. The VC GPT model may utilize several encoder and decoder layers with cross attention, and may utilize a simple ensemble model that considers both single and cross-modal connections with residual.

In some implementations, the bias recognition system may utilize a software stagewise regression network (SSR-Net) model to identify the image attribute data in the image data. Attributes of characters in an image may include age, gender, race, action, and/or the like. The SSR-Net model may include a CNN-based model for age and gender estimation that utilizes a simple and compact network with a multi-stage strategy. In some implementations, the bias recognition system may utilize a DeepFace model to identify the image attribute data (e.g., race data) in the image data. The DeepFace model may utilize a visual geometry group (VGG) face model as a base network with race identifying outputs (e.g., Asian, Black, Indian, Latino, Hispanic, Middle Eastern, White, and/or the like).

Figure 1E:
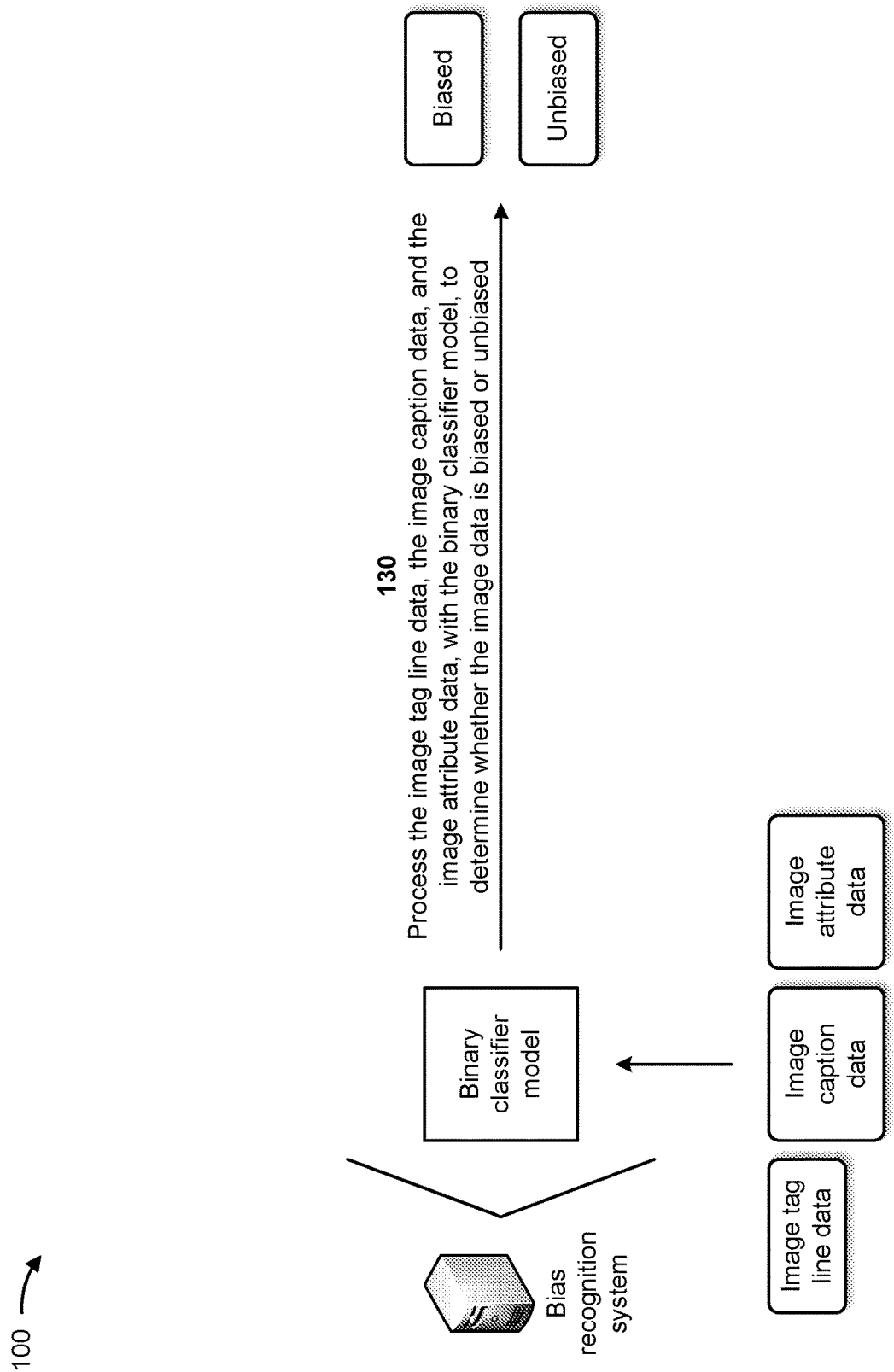

As shown in FIG. 1E, and by reference number 130, the bias recognition system may process the image tag line data, the image caption data, and the image attribute data, with the binary classifier model, to determine whether the image data is biased or unbiased. For example, the BERT-based binary classifier model may process the image tag line data, the image caption data, and the image attribute data. The BERT-based binary classifier model may receive the image tag line data, the image caption data, and the image attribute data, and may generate position embeddings and token embeddings based on the image tag line data, the image caption data, and the image attribute data. The BERT-based binary classifier model may process the position embeddings and the token embeddings, with the multiple layer (e.g., twelve layer) BERT model that includes the feed forward network and the self-attention layer, to generate contextual embeddings. The BERT-based binary classifier model may process the contextual embeddings, with the linear layer and then with the softmax layer, to generate a classification for the image tag line data, the image caption data, and/or the image attribute data. The classification may include an indication of whether the image tag line data, the image caption data, and/or the image attribute data is biased or unbiased (e.g., neutral). If the BERT-based binary classifier model determines that the image tag line data, the image caption data, and the image attribute data is unbiased, the bias recognition system may provide, for display, information indicating that the image tag line data, the image caption data, and the image attribute data of the multimodal content are unbiased.

Figure 1F:
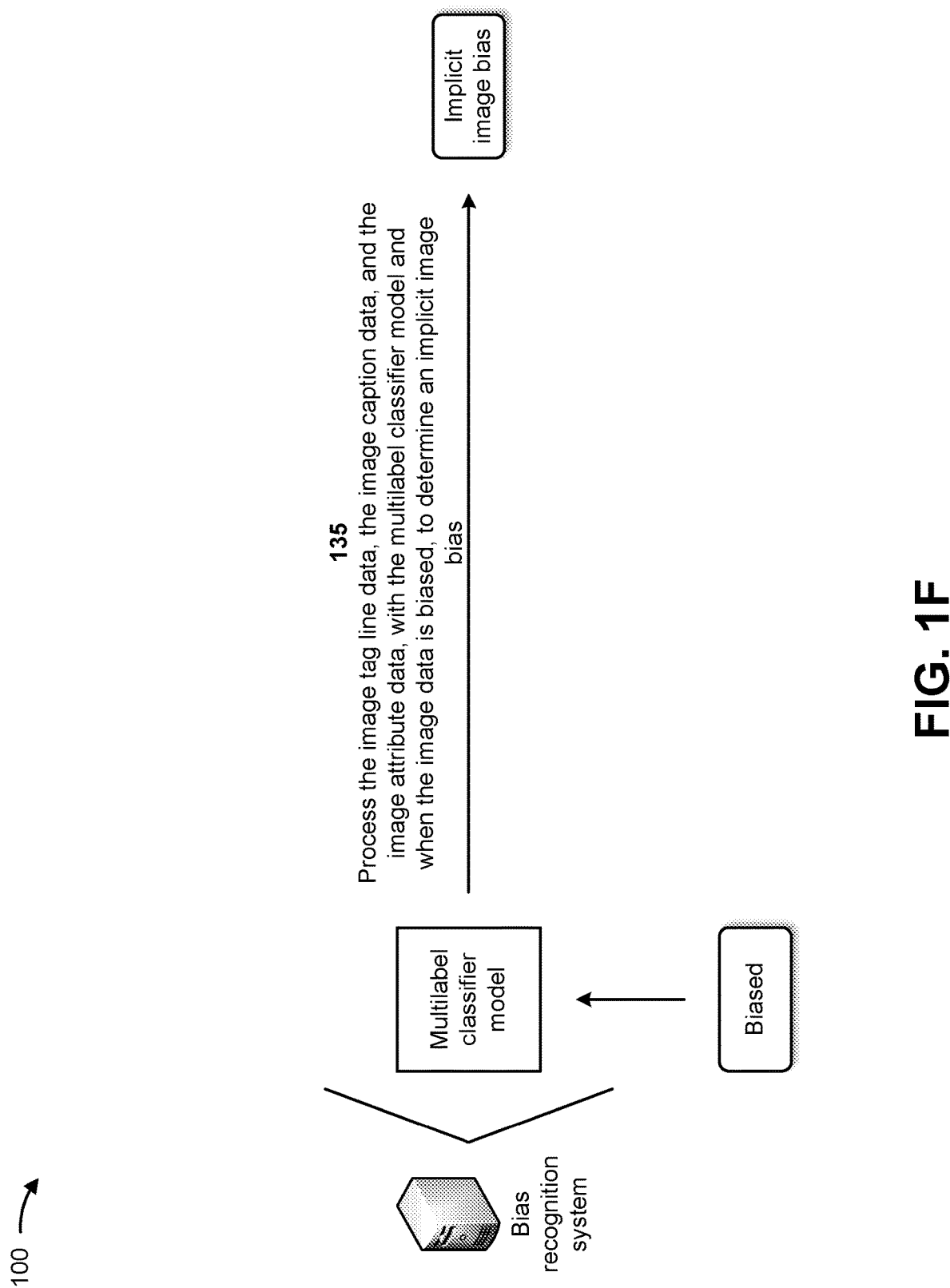

As shown in FIG. 1F, and by reference number 135, the bias recognition system may process the image tag line data, the image caption data, and the image attribute data, with the multilabel classifier model and when the image data is biased, to determine an implicit image bias. For example, the BART-based multilabel classifier model may process the image tag line data, the image caption data, and the image attribute data when the BERT-based binary classifier model determines that the image tag line data, the image caption data, and/or the image attribute data is biased. The BART-based multilabel classifier model may receive the image tag line data, the image caption data, and the image attribute data, and may generate position embeddings and token embeddings based on the image tag line data, the image caption data, and the image attribute data. The BART-based multilabel classifier model may process the position embeddings and the token embeddings, with the multiple layer (e.g., twelve layer) BART model that includes a feed forward network and a self-attention layer, to generate contextual embeddings. The BART-based multilabel classifier model may process the contextual embeddings, with the linear layer and then with the binary cross entropy layer, to determine one or more implicit image biases associated with the image tag line data, the image caption data, and/or the image attribute data. The implicit image biases may be associated with an age bias, a gender bias, a race bias, a religious bias, a sexuality bias, an occupational bias, a physical appearance bias, and/or the like.

Figure 1G:
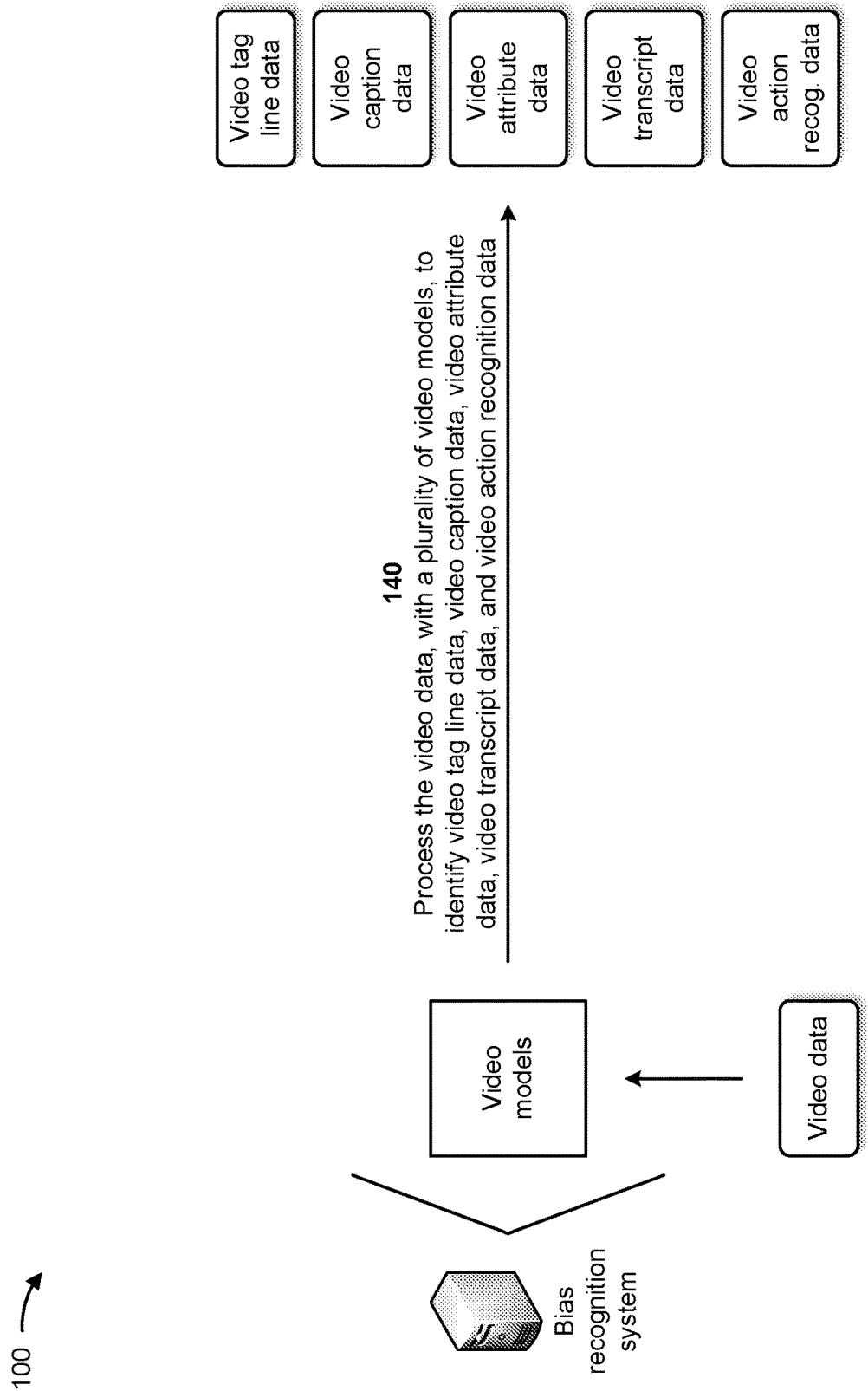

As shown in FIG. 1G, and by reference number 140, the bias recognition system may process the video data, with a plurality of video models, to identify video tag line data, video caption data, video attribute data, video transcript data, and video action recognition data. For example, the video data may include video tag line data (e.g., actual text in a video), video caption data (e.g., identifying an event in an image, such as "a man driving a black car"), video attribute data (e.g., identifying attributes of characters present in a video), video transcript data (e.g., a transcript of dialog in a video), and video action recognition data (e.g., identifying actions of characters present in a video). The bias recognition system may utilize different video models to identify the video tag line data, the video caption data, the video attribute data, the video transcript data, and the video action recognition data.

In some implementations, the bias recognition system may utilize a Paddle OCR model to identify the video tag line data in the video data. The Paddle OCR model may include a one-dimensional CNN model with a CTC loss function. The Paddle OCR model may include an OCR framework or toolkit that provides multilingual practical OCR tools that help users to apply and train different models in a few lines of code. The Paddle OCR model may include a text detection model, a text direction classifier model, and a text recognition model. The text detection model may include an SAST detector that utilizes context attention multitask learning based on fully connected networks to learn geometric representations of text regions in the video data. The Paddle OCR model may include a CAB that learns sequential long range dependencies of pixel information in the video data.

In some implementations, the bias recognition system may utilize a transformer-based model to identify the video caption data in the video data. Video captioning may include automatic captioning of a video by understanding actions and events in the video, which may aid in retrieval of the video based on a text search. The transformer-based model may include a bimodal transformer (BMT) model with a proposal generator model that efficiently utilizes audio and visual input sequences to select events in a video, and utilizes the selected events in the video to generate a textual description (e.g., the video caption data) in the video data. The BMT model may include an encoder layer that receives audio and visual data of the video data, and selects the events in the video data based on the audio and visual data. The BMT model may include a proposal generator that generates a textual description based on the selected events in the video data. The BMT model may include a decoder layer that generates the video caption data based on the textual description generated by the proposal generator.

In some implementations, the bias recognition system may utilize an SSR-Net model to identify the video attribute data in the video data. Attributes of characters in a video may include age, gender, race, action, and/or the like. The SSR-Net model may include a CNN-based model for age and gender estimation that utilizes a simple and compact network with a multi-stage strategy. In some implementations, the bias recognition system may utilize a DeepFace model to identify the video attribute data (e.g., race data) in the video data. The DeepFace model may utilize a VGG face model as a base network with race identifying outputs (e.g., Asian, Black, Indian, Latino, Hispanic, Middle Eastern, White, and/or the like).

In some implementations, the bias recognition system may utilize an automatic speech recognition (ASR) model to identify the video transcript data in the video data. Automatic speech recognition relates to the problem of enabling software to automatically transcribe spoken language (e.g., speech-to-text). The ASR model may include an NVIDIA NeMo model that utilizes a QuartzNet model (e.g., which is a version of a Jasper model with separable convolutions and larger filters). The ASR model may include blocks with one-dimensional separable convolution, pointwise conversion, batch normalization, and a rectified linear unit (ReLU).

In some implementations, the bias recognition system may utilize an action recognition model to identify the video action recognition data in the video data. Human action recognition (HAR) may include understanding human behavior in the video data and assigning a label to each action in the video data. The video action recognition data may include data identifying interactions among humans or interactions between humans and objects. The action recognition model may include a temporal shift module (TSM) model, which is a high-efficiency and low-complexity based video understanding model. The TSM model may be trained on any video recognition dataset for predicting actions in the video recognition dataset. The TSM model may receive the video data, and may shift in both past and future frames of the video data with a current frame of the video data. The TSM model may include an in-place TSM model or a residual TSM model. The in-place TSM model may add a shift module before each convolutional layer. The residual TSM model may add a shift module inside a residual branch.

Figure 1H:
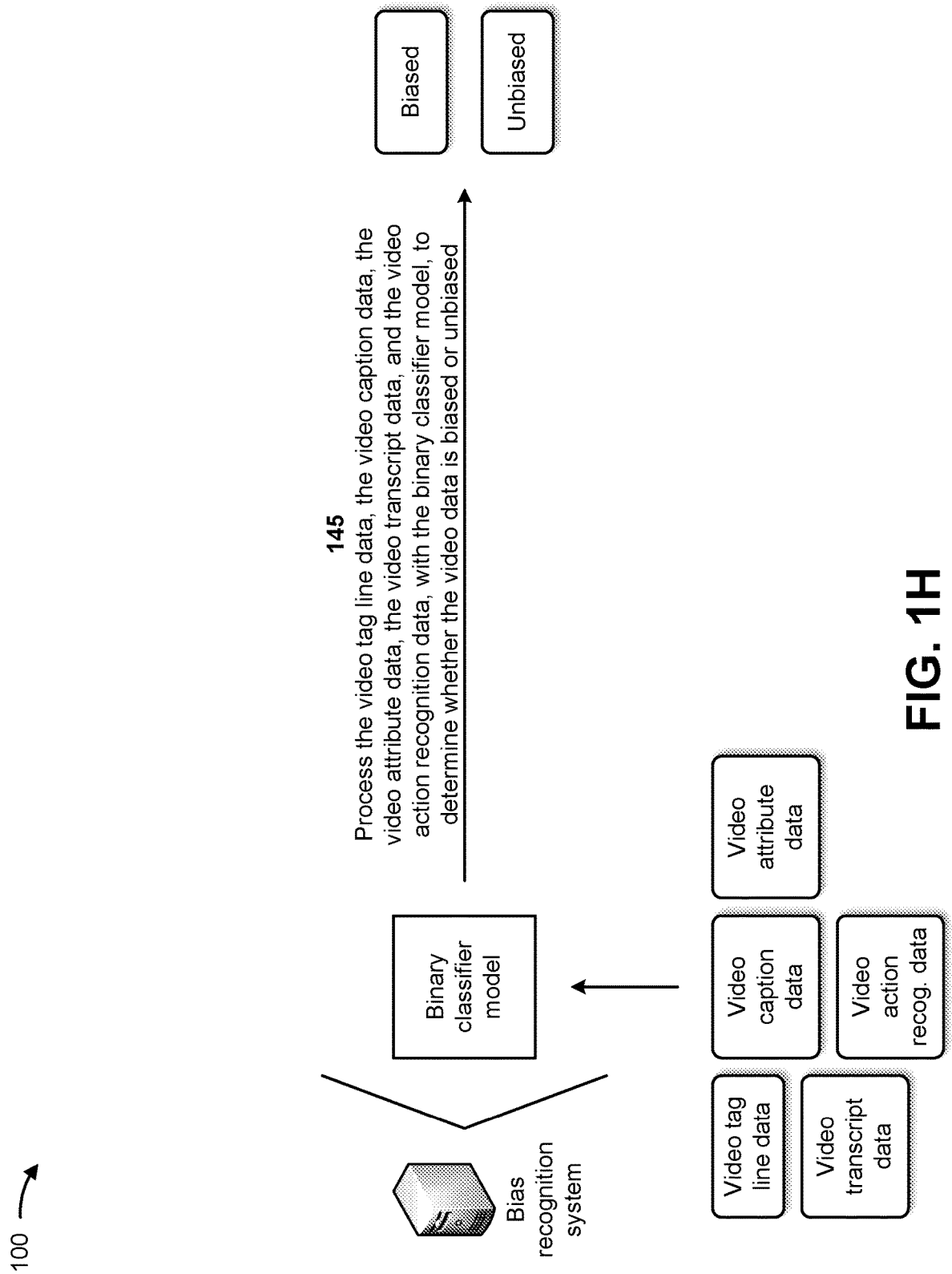

As shown in FIG. 1H, and by reference number 145, the bias recognition system may process the video tag line data, the video caption data, the video attribute data, the video transcript data, and the video action recognition data, with the binary classifier model, to determine whether the video data is biased or unbiased. For example, the BERT-based binary classifier model may process the video tag line data, the video caption data, the video attribute data, the video transcript data, and the video action recognition data. The BERT-based binary classifier model may receive the video tag line data, the video caption data, the video attribute data, the video transcript data, and the video action recognition data, and may generate position embeddings and token embeddings based on the video tag line data, the video caption data, the video attribute data, the video transcript data, and the video action recognition data. The BERT-based binary classifier model may process the position embeddings and the token embeddings, with the multiple layer (e.g., twelve layer) BERT model that includes the feed forward network and the self-attention layer, to generate contextual embeddings.

The BERT-based binary classifier model may process the contextual embeddings, with the linear layer and then with the softmax layer, to generate a classification for the video tag line data, the video caption data, the video attribute data, the video transcript data, and the video action recognition data. The classification may include an indication of whether the video tag line data, the video caption data, the video attribute data, the video transcript data, and/or the video action recognition data is biased or unbiased (e.g., neutral). If the BERT-based binary classifier model determines that the video tag line data, the video caption data, the video attribute data, the video transcript data, and the video action recognition data is unbiased, the bias recognition system may provide, for display, information indicating that the video tag line data, the video caption data, the video attribute data, the video transcript data, and the video action recognition data of the multimodal content is unbiased.

Figure 1I:
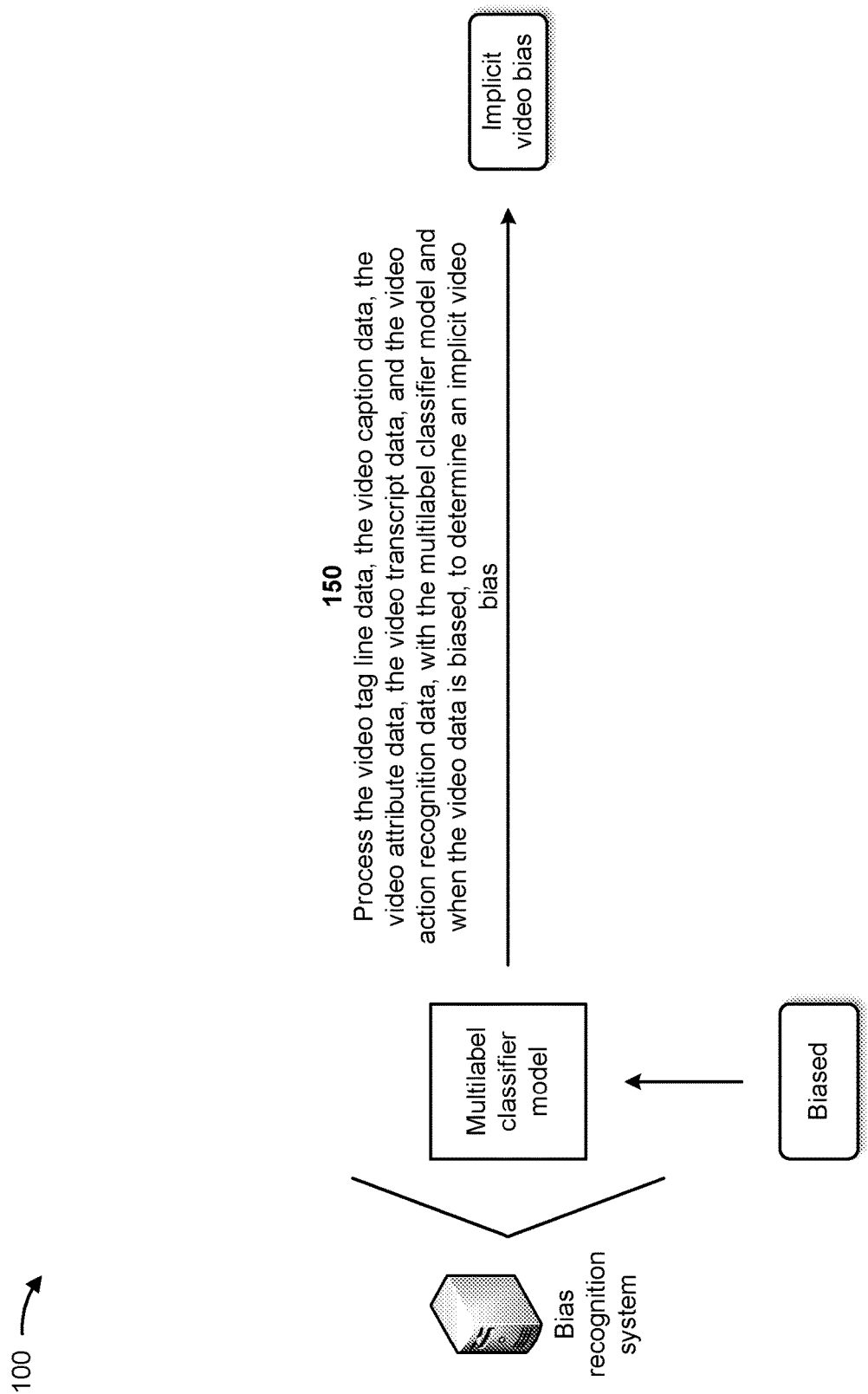

As shown in FIG. 1I, and by reference number 150, the bias recognition system may process the video tag line data, the video caption data, the video attribute data, the video transcript data, and the video action recognition data, with the multilabel classifier model and when the video data is biased, to determine an implicit video bias. For example, the BART-based multilabel classifier model may process the video tag line data, the video caption data, the video attribute data, the video transcript data, and the video action recognition data when the BERT-based binary classifier model determines that the video tag line data, the video caption data, the video attribute data, the video transcript data, and/or the video action recognition data is biased. The BART-based multilabel classifier model may receive the video tag line data, the video caption data, the video attribute data, the video transcript data, and the video action recognition data, and may generate position embeddings and token embeddings based on the image tag line data, the image caption data, and the image attribute data.

The BART-based multilabel classifier model may process the position embeddings and the token embeddings, with the multiple layer (e.g., twelve layer) BART model that includes a feed forward network and a self-attention layer, to generate contextual embeddings. The BART-based multilabel classifier model may process the contextual embeddings, with the linear layer and then with the binary cross entropy layer, to determine one or more implicit video biases associated with the video tag line data, the video caption data, the video attribute data, the video transcript data, and/or the video action recognition data. The implicit video biases may be associated with an age bias, a gender bias, a race bias, a religious bias, a sexuality bias, an occupational bias, a physical appearance bias, and/or the like.

Figure 1J:
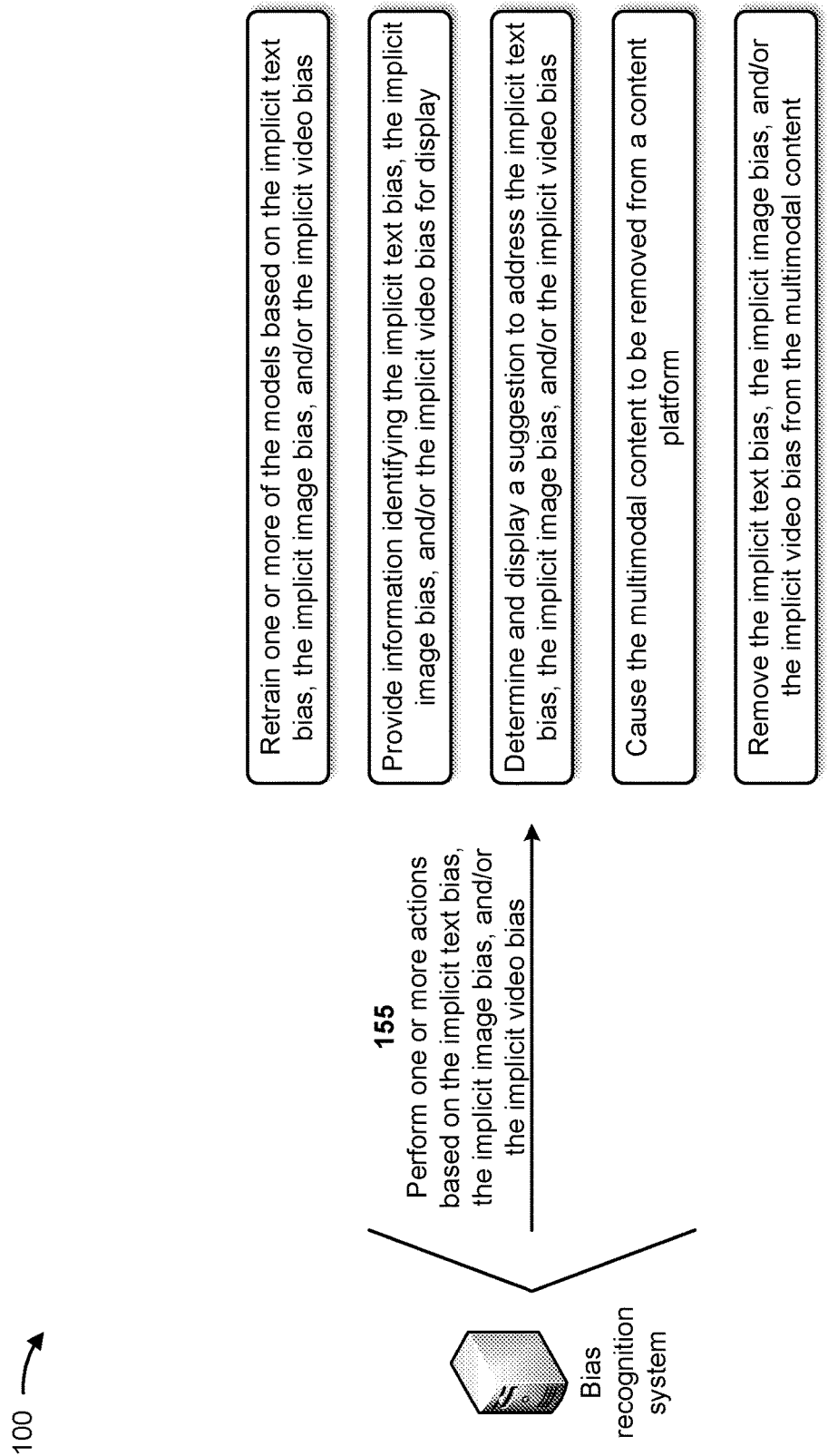

As shown in FIG. 1J, and by reference number 155, the bias recognition system may perform one or more actions based on the implicit text bias, the implicit image bias, and/or the implicit video bias. In some implementations, when performing the one or more actions, the bias recognition system may retrain one or more of the models described above based on the implicit text bias, the implicit image bias, and/or the implicit video bias. For example, the bias recognition system may utilize the implicit text bias, the implicit image bias, and/or the implicit video bias as additional training data for retraining the one or more of the models, thereby increasing the quantity of training data available for training the one or more of the models. Accordingly, the bias recognition system may conserve computing resources associated with identifying, obtaining, and/or generating historical data for training the one or more of the models relative to other systems for identifying, obtaining, and/or generating historical data for training machine learning models.

In some implementations, when performing the one or more actions, the bias recognition system may provide information identifying the implicit text bias, the implicit image bias, and/or the implicit video bias for display. For example, the bias recognition system may provide the information identifying the implicit text bias, the implicit image bias, and/or the implicit video bias to the user device, and the user device may display the information identifying the implicit text bias, the implicit image bias, and/or the implicit video bias to the user. The user may utilize the information to modify the multimodal content to remove the implicit text bias, the implicit image bias, and/or the implicit video bias, delete the multimodal content, and/or the like. In this way, the bias recognition system conserves computing resources, networking resources, and/or the like that would otherwise have been consumed in providing an incorrect identification of bias in content.

In some implementations, when performing the one or more actions, the bias recognition system may determine and provide for display a suggestion to address the implicit text bias, the implicit image bias, and/or the implicit video bias. For example, the bias recognition system may determine a suggestion to address the implicit text bias, the implicit image bias, and/or the implicit video bias, and may provide the suggestion to the user device. The user device may display the suggestion to the user and the user may utilize the suggestion to modify the multimodal content to remove the implicit text bias, the implicit image bias, and/or the implicit video bias, delete the multimodal content, and/or the like. In this way, the bias recognition system conserves computing resources, networking resources, and/or the like that would otherwise have been consumed in failing to properly identify bias in multimodal content.

In some implementations, when performing the one or more actions, the bias recognition system may cause the multimodal content to be removed from a content platform. For example, the bias recognition system may instruct a content platform hosting the multimodal content to delete the multimodal content (or stop hosting the multimodal content), and the content platform may delete the multimodal content based on the instruction from the bias recognition system. In this way, the bias recognition system conserves computing resources, networking resources, and/or the like that would otherwise have been consumed in handling customer complaints due to bias not properly identified in multimodal content.

In some implementations, when performing the one or more actions, the bias recognition system may remove the implicit text bias, the implicit image bias, and/or the implicit video bias from the multimodal content. For example, the bias recognition system may remove the implicit text bias, the implicit image bias, and/or the implicit video bias from the multimodal content (e.g., by removing text, dialog, frames, audio, and/or the like) to generate modified multimodal content. The bias recognition system may provide the modified multimodal content to the user device, and the user device may display the modified multimodal content to the user. In this way, the bias recognition system conserves computing resources, networking resources, and/or the like that would otherwise have been consumed in handling lost business due to bias not properly identified in multimodal content.

In some implementations, the bias recognition system may perform an assessment of the multimodal content to create a textual representation of a narrative. The multimodal content may be converted to textual representations that may be processed by the binary classifier model and/or the multilabel classifier model. To create a textual representation, the bias recognition system may define a form in which a pre-context of an image or a video can be captured, irrespective of the availability of any text and/or speech in the image or the video. The bias recognition system may establish a connection between text, speech, and images available in the multimodal content to detect bias, since individually the text, the speech, and the images may be unbiased but connecting the different forms of content may indicate bias. Once a description (e.g., a caption) is generated of an image or a video, the bias recognition system may connect attributes of characters present in the image or the video to the textual representation. The bias recognition system may utilize the cross entropy layer and the attention layer of the models described herein to determine a relationship between the character attributes and the textual representation for classifying the multimodal content as bias or unbiased.

The bias recognition system may include multiple models that identify bias in a statement individually, identify bias in a context of previous statements or pictorial elements, examine a manner in which a character is portrayed (e.g., in a positive light or a negative light), compare a story line with predefined cultural narratives to ultimately detect implicit bias, and/or the like. The bias recognition system may utilize information from text, images, video, and predefined cultural narratives to flag potential biases and/or stereotypes, and may determine biases from context and clearly defined cultural narratives. Given text, an image, and/or a sequence of images, the bias recognition system may identify a target (e.g., gender, race, age, and/or the like), a sentiment, an activity, an occupation, and other relevant objects, and may utilize a combination of deep learning models and a knowledge base of cultural narratives to detect a potential bias.

In this way, the bias recognition system utilizes machine learning models to identify implicit bias in multimodal content. The bias recognition system may utilize machine learning models that provide a natural language understanding of text data, image and attribute extraction of image data, and computer vision techniques (e.g., facial recognition, emotion detection, object detection, computational aesthetics, and/or the like) of video data to identify bias (e.g., implicit bias) in multimodal content. This, in turn, conserves computing resources, networking resources, and/or the like that would otherwise have been consumed in providing an incorrect identification of bias in content, failing to properly identify bias in multimodal content, handling customer complaints due to bias not properly identified in multimodal content, handling lost business due to bias not properly identified in multimodal content, and/or the like.

As indicated above, FIGS. 1A-1J are provided as an example. Other examples may differ from what is described with regard to FIGS. 1A-1J. The number and arrangement of devices shown in FIGS. 1A-1J are provided as an example. In practice, there may be additional devices, fewer devices, different devices, or differently arranged devices than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) shown in FIGS. 1A-1J may perform one or more functions described as being performed by another set of devices shown in FIGS. 1A-1J.

Figure 2:
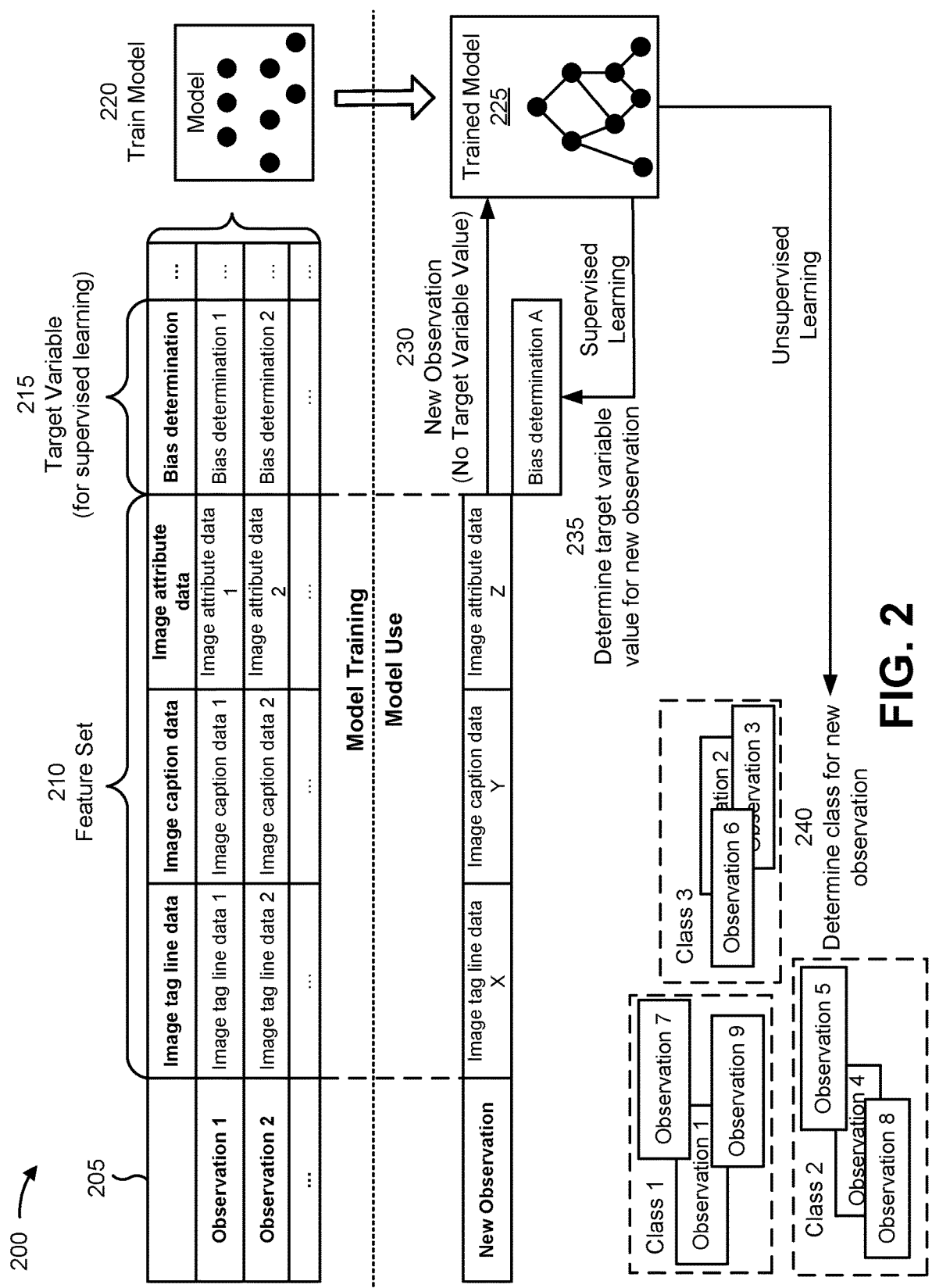
FIG. 2 is a diagram illustrating an example of training and using a machine learning model.

FIG. 2 is a diagram illustrating an example 200 of training and using a machine learning model for identifying implicit bias in multimodal content. The machine learning model training and usage described herein may be performed using a machine learning system. The machine learning system may include or may be included in a computing device, a server, a cloud computing environment, and/or the like, such as the bias recognition system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the bias recognition system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the bias recognition system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of image tag line data, a second feature of image caption data, a third feature of image attribute data, and so on. As shown, for a first observation, the first feature may have a value of image tag line data 1, the second feature may have a value of image caption data 1, the third feature may have a value of image attribute data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be a bias determination and may include a value of bias determination 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using classification and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm (e.g., a convolution neural network model), a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of image tag line data X, a second feature of image caption data Y, a third feature of image attribute data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a class to which the new observation belongs, information that indicates a degree of similarity between the new observation and one or more other observations, and/or the like, such as when unsupervised learning is employed.

As an example, the trained machine learning model 225 may predict a value of bias determination A for the target variable of the bias determination for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify the new observation in a class, as shown by reference number 240. The observations within a class may have a threshold degree of similarity. As an example, if the machine learning system classifies the new observation in a first class (e.g., an image tag line data class), then the machine learning system may provide a first recommendation. Additionally, or alternatively, the machine learning system may perform a first automated action and/or may cause a first automated action to be performed (e.g., by instructing another device to perform the automated action) based on classifying the new observation in the first class.

As another example, if the machine learning system were to classify the new observation in a second class (e.g., an image caption data class), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a class in which the new observation is classified, and/or the like.

In this way, the machine learning system may apply a rigorous and automated process to identify implicit bias in multimodal content. The machine learning system enables recognition and/or identification of tens, hundreds, thousands, or millions of features and/or feature values for tens, hundreds, thousands, or millions of observations, thereby increasing accuracy and consistency and reducing delay associated with identifying implicit bias in multimodal content relative to requiring computing resources to be allocated for tens, hundreds, or thousands of operators to manually identify implicit bias in multimodal content.

As indicated above, FIG. 2 is provided as an example. Other examples may differ from what is described in connection with FIG. 2.

Figure 3:
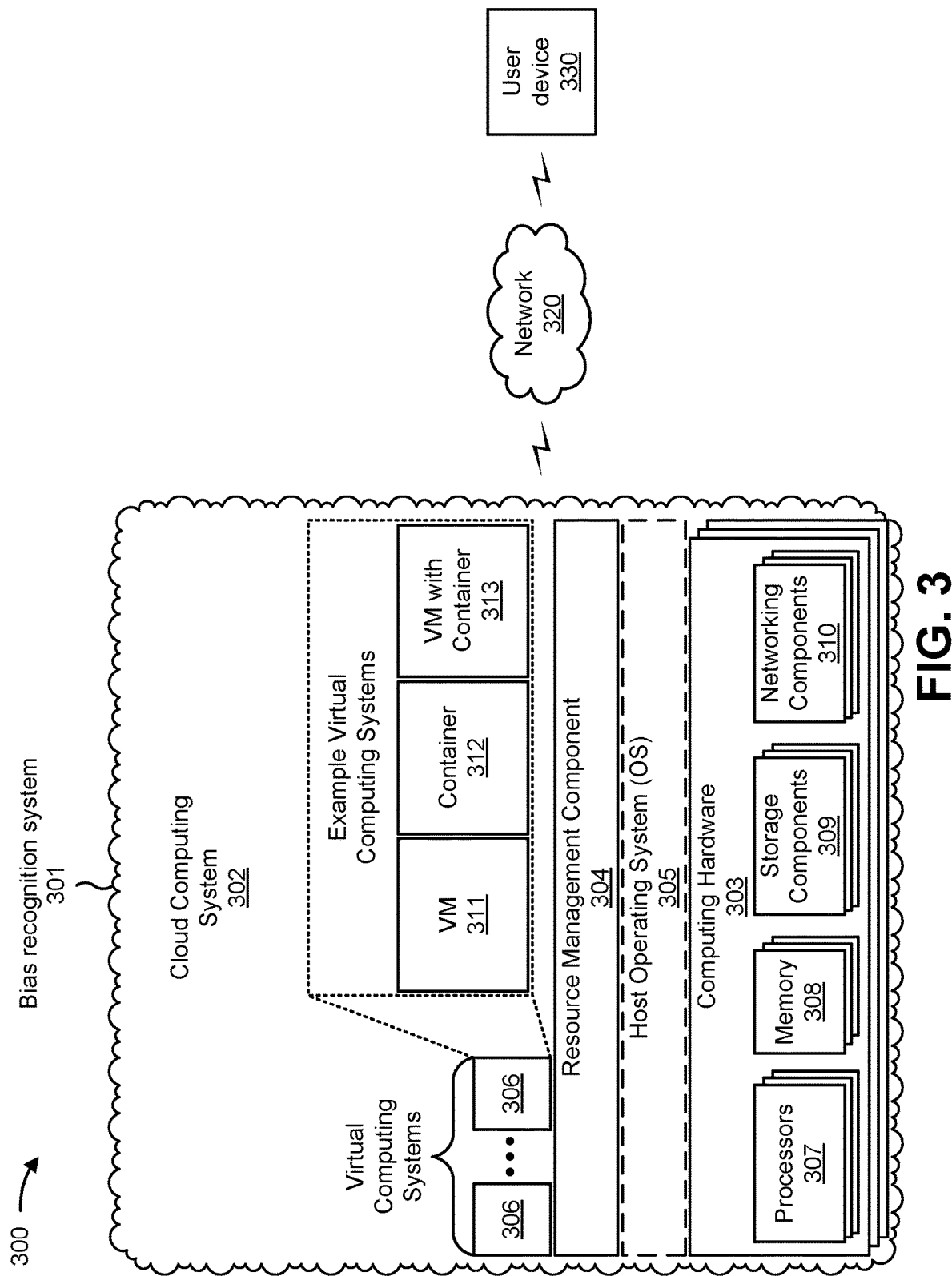
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include a bias recognition system 301, which may include one or more elements of and/or may execute within a cloud computing system 302. The cloud computing system 302 may include one or more elements 303-313, as described in more detail below. As further shown in FIG. 3, the environment 300 may include a network 320 and/or a user device 330. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the bias recognition system 301 may include one or more elements 303-313 of the cloud computing system 302, may execute within the cloud computing system 302, and/or may be hosted within the cloud computing system 302, in some implementations, the bias recognition system 301 may not be cloud-based (e.g., may be implemented outside of a cloud computing system) or may be partially cloud-based. For example, the bias recognition system 301 may include one or more devices that are not part of the cloud computing system 302, such as device 400 of FIG. 4, which may include a standalone server or another type of computing device. The bias recognition system 301 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or the like, and/or a combination of these or other types of networks. The network 320 enables communication among the devices of the environment 300.

The user device 330 may include one or more devices capable of receiving, generating, storing, processing, and/or providing information, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
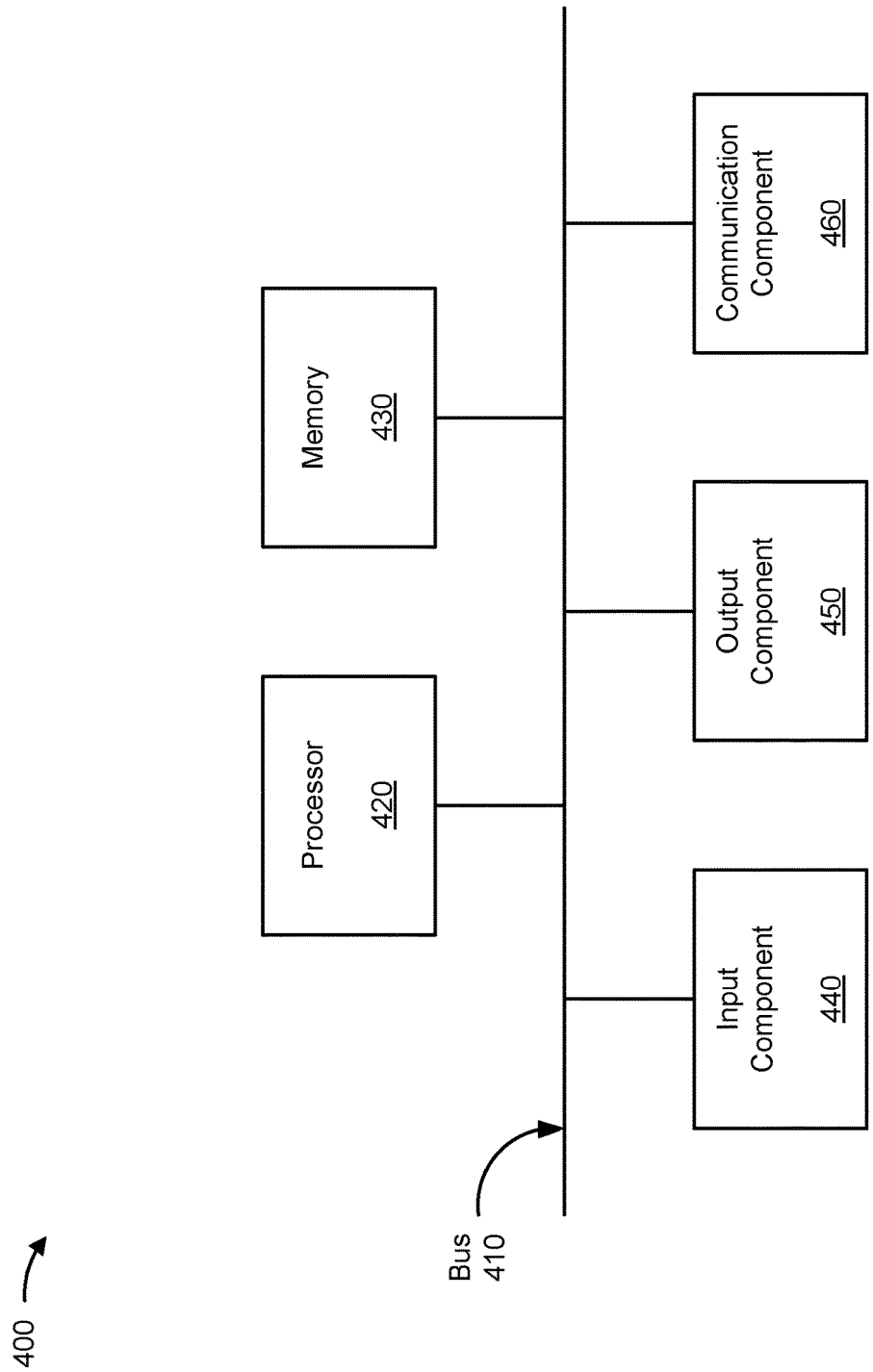
FIG. 4 is a diagram of example components of one or more devices of FIG. 3.

FIG. 4 is a diagram of example components of a device 400, which may correspond to the bias recognition system 301 and/or the user device 330. In some implementations, the bias recognition system 301 and/or the user device 330 may include one or more devices 400 and/or one or more components of the device 400. As shown in FIG. 4, the device 400 may include a bus 410, a processor 420, a memory 430, an input component 440, an output component 450, and a communication component 460.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The input component 440 enables the device 400 to receive input, such as user input and/or sensed inputs. For example, the input component 440 may include a touch screen, a keyboard, a keypad, a mouse, a button, a microphone, a switch, a sensor, a global positioning system component, an accelerometer, a gyroscope, an actuator, and/or the like. The output component 450 enables the device 400 to provide output, such as via a display, a speaker, and/or one or more light-emitting diodes. The communication component 460 enables the device 400 to communicate with other devices, such as via a wired connection and/or a wireless connection. For example, the communication component 460 may include a receiver, a transmitter, a transceiver, a modem, a network interface card, an antenna, and/or the like.

The device 400 may perform one or more processes described herein. For example, a non-transitory computer-readable medium (e.g., the memory 430) may store a set of instructions (e.g., one or more instructions, code, software code, program code, and/or the like) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
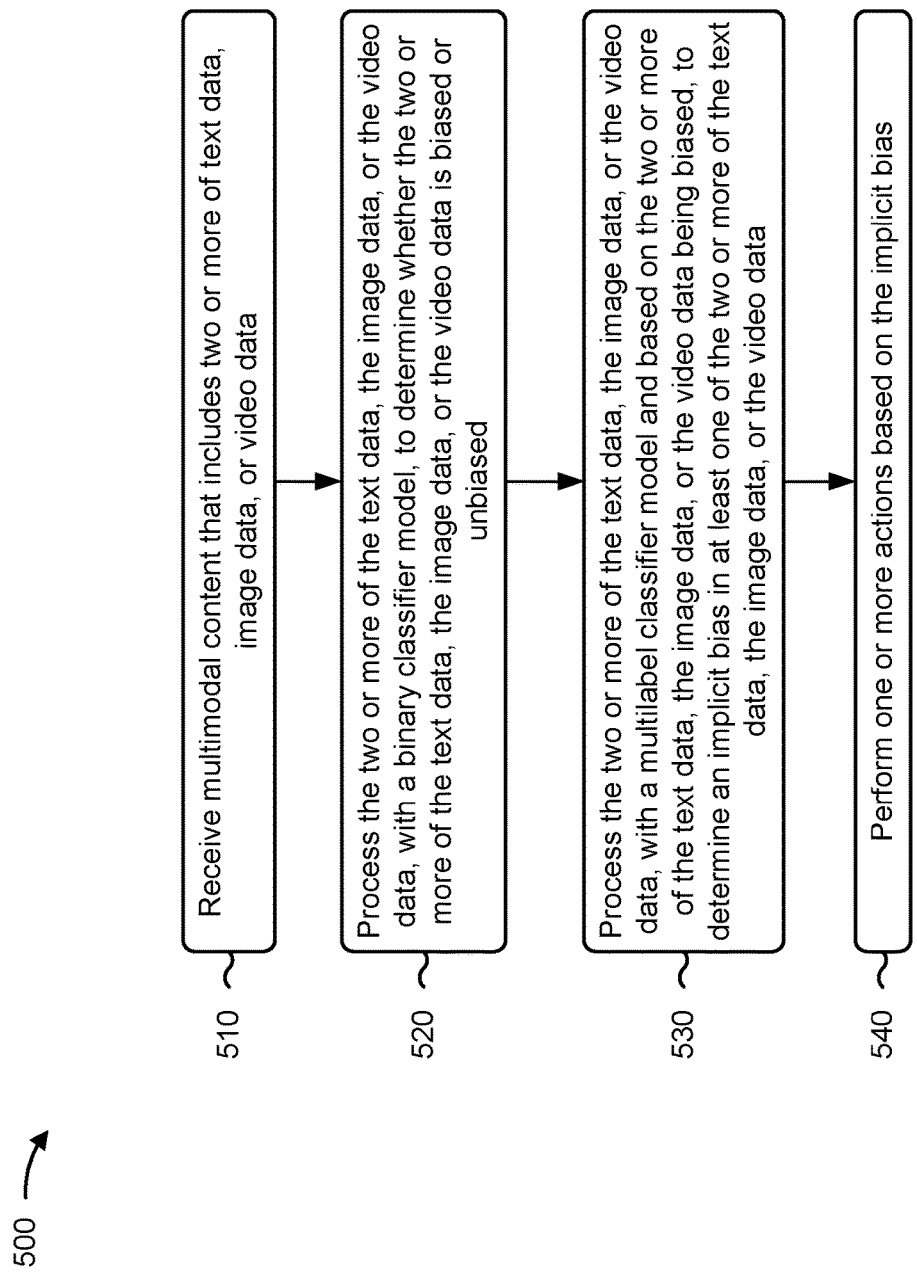
FIG. 5 is a flowchart of an example process for utilizing machine learning models to identify implicit bias in multimodal content.

FIG. 5 is a flowchart of an example process 500 for utilizing machine learning models to identify implicit bias in multimodal content. In some implementations, one or more process blocks of FIG. 5 may be performed by a device (e.g., the bias recognition system 301). In some implementations, one or more process blocks of FIG. 5 may be performed by another device or a group of devices separate from or including the device, such as a user device (e.g., the user device 330). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving multimodal content that includes two or more of text data, image data, or video data (block 510). For example, the device may receive multimodal content that includes two or more of text data, image data, or video data, as described above.

As further shown in FIG. 5, process 500 may include processing the two or more of the text data, the image data, or the video data, with a binary classifier model, to determine whether the two or more of the text data, the image data, or the video data is biased or unbiased (block 520). For example, the device may process the two or more of the text data, the image data, or the video data, with a binary classifier model, to determine whether the two or more of the text data, the image data, or the video data is biased or unbiased, as described above. In some implementations, the binary classifier model includes a bidirectional encoder representations from transformers model.

As further shown in FIG. 5, process 500 may include processing the two or more of the text data, the image data, or the video data, with a multilabel classifier model and based on the two or more of the text data, the image data, or the video data being biased, to determine an implicit bias in at least one of the two or more of the text data, the image data, or the video data (block 530). For example, the device may process the two or more of the text data, the image data, or the video data, with a multilabel classifier model and based on the two or more of the text data, the image data, or the video data being biased, to determine an implicit bias in at least one of the two or more of the text data, the image data, or the video data, as described above. In some implementations, the multilabel classifier model includes a bidirectional auto-regressive transformers model. In some implementations, the implicit bias is associated with one or more of an age bias, a gender bias, a race bias, a religious bias, a sexuality bias, an occupational bias, or a physical appearance bias.

As further shown in FIG. 5, process 500 may include performing one or more actions based on the implicit bias (block 540). For example, the device may perform one or more actions based on the implicit bias, as described above. In some implementations, performing the one or more actions includes one or more of retraining one or more of the binary classifier model or the multilabel classifier model, based on the implicit bias, or providing information identifying the implicit bias for display. In some implementations, performing the one or more actions includes determining a suggestion to address the implicit bias, and providing the suggestion for display. In some implementations, performing the one or more actions includes one or more of causing the multimodal content to be removed from a content platform, or removing the implicit bias from the multimodal content.

In some implementations, process 500 includes utilizing a plurality of image models to identify image tag line data, image caption data, and image attribute data in the image data; wherein processing the two or more of the text data, the image data, or the video data, with the binary classifier model includes processing the image tag line data, the image caption data, and the image attribute data, with the binary classifier model, to determine whether the image data is biased or unbiased; wherein processing the two or more of the text data, the image data, or the video data with the multilabel classifier model includes processing the image tag line data, the image caption data, and the image attribute data, with the multilabel classifier model and based on the image data being biased, to determine an implicit image bias.

In some implementations, utilizing the plurality of image models to identify the image tag line data, the image caption data, and the image attribute data in the image data comprises utilizing a Paddle optical character recognition (OCR) model to identify the image tag line in the image data, utilizing a transformer-based model to identify the image caption data in the image data, and utilizing a software stagewise regression network model to identify the image attribute data in the image data. In some implementations, the Paddle OCR model includes a single-shot arbitrarily-shaped text detector.

In some implementations, process 500 includes utilizing a plurality of video models to identify video tag line data, video caption data, video attribute data, video transcript data, and video action recognition data in the video data; wherein processing the two or more of the text data, the image data, or the video data, with the binary classifier model includes processing the video tag line data, the video caption data, the video attribute data, the video transcript data, and the video action recognition data, with the binary classifier model, to determine whether the video data is biased or unbiased; wherein processing the two or more of the text data, the image data, or the video data with the multilabel classifier model includes processing the video tag line data, the video caption data, the video attribute data, the video transcript data, and the video action recognition data, with the multilabel classifier model and based on the video data being biased, to determine an implicit video bias.

In some implementations, utilizing the plurality of video models to identify the video transcript data and the video action recognition data in the video data comprises utilizing an automatic speech recognition model to identify the video transcript data in the video data, and utilizing an action recognition model to identify the video action recognition data in the video data.

In some implementations, process 500 includes identifying pre-context data associated with the text data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
  receiving, by a device, multimodal content that includes two or more of text data, image data, or video data;
  processing, by the device, the two or more of the text data, the image data, or the video data, with a binary classifier model, to determine whether the two or more of the text data, the image data, or the video data is biased or unbiased;
  processing, by the device, the two or more of the text data, the image data, or the video data, with a multilabel classifier model and based on the two or more of the text data, the image data, or the video data being biased, to determine an implicit bias in at least one of the two or more of the text data, the image data, or the video data; and
  performing, by the device, one or more actions based on the implicit bias; and
  utilizing a plurality of image models to identify image tag line data, image caption data, and image attribute data in the image data,
    wherein the processing the two or more of the text data, the image data, or the video data, with the binary classifier model comprises:
      processing the image tag line data, the image caption data, and the image attribute data, with the binary classifier model, to determine whether the image data is biased or unbiased,
    wherein the processing the two or more of the text data, the image data, or the video data with the multilabel classifier model comprises:
      processing the image tag line data, the image caption data, and the image attribute data, with the multilabel classifier model and based on the image data being biased, to determine an implicit image bias.

2. The method of claim 1, further comprising:
  identifying pre-context data associated with the text data.

3. The method of claim 1, wherein utilizing the plurality of image models to identify the image tag line data, the image caption data, and the image attribute data in the image data comprises:
  utilizing a Paddle optical character recognition (OCR) model to identify the image tag line in the image data;
  utilizing a transformer-based model to identify the image caption data in the image data; and
  utilizing a software stagewise regression network model to identify the image attribute data in the image data.

4. The method of claim 3, wherein the Paddle OCR model includes a single-shot arbitrarily-shaped text detector.

5. The method of claim 1, further comprising:
utilizing a plurality of video models to identify video tag line data, video caption data, video attribute data, video transcript data, and video action recognition data in the video data;
wherein processing the two or more of the text data, the image data, or the video data, with the binary classifier model comprises:
processing the video tag line data, the video caption data, the video attribute data, the video transcript data, and the video action recognition data, with the binary classifier model, to determine whether the video data is biased or unbiased;
wherein processing the two or more of the text data, the image data, or the video data with the multilabel classifier model comprises:
processing the video tag line data, the video caption data, the video attribute data, the video transcript data, and the video action recognition data, with the multilabel classifier model and based on the video data being biased, to determine an implicit video bias.

6. The method of claim 5, wherein utilizing the plurality of video models to identify the video transcript data and the video action recognition data in the video data comprises:
utilizing an automatic speech recognition model to identify the video transcript data in the video data; and
utilizing an action recognition model to identify the video action recognition data in the video data.

7. A device, comprising:
one or more memories; and
one or more processors, coupled to the one or more memories, configured to:
receive multimodal content that includes two or more of text data, image data, or video data;
process the two or more of the text data, the image data, or the video data of the multimodal content, with a binary classifier model, to determine whether the multimodal content is biased or unbiased;
process the two or more of the text data, the image data, or the video data of the multimodal content, with a multilabel classifier model and based on the multimodal content being biased, to determine an implicit bias in the multimodal content; and
perform one or more actions based on the implicit bias; and
utilize a plurality of image models to identify image tag line data, image caption data, and image attribute data in the image data,
wherein processing the two or more of the text data, the image data, or the video data, with the binary classifier model comprises:
processing the image tag line data, the image caption data, and the image attribute data, with the binary classifier model, to determine whether the image data is biased or unbiased,
wherein processing the two or more of the text data, the image data, or the video data with the multilabel classifier model comprises:
processing the image tag line data, the image caption data, and the image attribute data, with the multilabel classifier model and based on the image data being biased, to determine an implicit image bias.

8. The device of claim 7, wherein the one or more processors, to perform the one or more actions, are configured to one or more of:
cause the multimodal content to be removed from a content platform; or
remove the implicit bias from the multimodal content.

9. The device of claim 7, wherein the binary classifier model includes a bidirectional encoder representations from transformers model.

10. The device of claim 8, wherein the multilabel classifier model includes a bidirectional auto-regressive transformers model.

11. The device of claim 8, wherein the implicit bias is associated with one or more of:
an age bias,
a gender bias,
a race bias,
a religious bias,
a sexuality bias,
an occupational bias, or
a physical appearance bias.

12. The device of claim 7, wherein the one or more processors, to perform the one or more actions, are configured to one or more of:
retrain one or more of the binary classifier model or the multilabel classifier model, based on the implicit bias; or
provide information identifying the implicit bias for display.

13. The device of claim 7, wherein the one or more processors, to perform the one or more actions, are configured to:
determine a suggestion to address the implicit bias; and
provide the suggestion for display.

14. A non-transitory computer-readable medium storing a set of instructions, the set of instructions comprising:
one or more instructions that, when executed by one or more processors of a device, cause the device to:
receive multimodal content that includes two or more of text data, image data, or video data;
process the two or more of the text data, the image data, or the video data, with a binary classifier model, to determine whether the two or more of the text data, the image data, or the video data is biased or unbiased,
wherein the binary classifier model includes a bidirectional encoder representations from transformers model;
process the two or more of the text data, the image data, or the video data, with a multilabel classifier model and based on the two or more of the text data, the image data, or the video data being biased, to determine an implicit bias in at least one of the two or more of the text data, the image data, or the video data,
wherein the multilabel classifier model includes a bidirectional auto-regressive transformers model; and
perform one or more actions based on the implicit bias; and
utilize a plurality of image models to identify image tag line data, image caption data, and image attribute data in the image data,
wherein the one or more instructions, that cause the device to process the two or more of the text data, the image data, or the video data, with the binary classifier model, cause the device to:
process the image tag line data, the image caption data, and the image attribute data, with the binary classifier model, to determine whether the image data is biased or unbiased, wherein the one or more instructions, that cause the device to process the two or more of the text data, the image data, or the video data with the multilabel classifier model, cause the device to:

process the image tag line data, the image caption data, and the image attribute data, with the multilabel classifier model and based on the image data being biased, to determine an implicit image bias.

15. The non-transitory computer-readable medium of claim 14, wherein the one or more instructions further cause the device to:

utilize a plurality of video models to identify video tag line data, video caption data, video attribute data, video transcript data, and video action recognition data in the video data;

wherein the one or more instructions, that cause the device to process the two or more of the text data, the image data, or the video data, with the binary classifier model, cause the device to:

process the video tag line data, the video caption data, the video attribute data, the video transcript data, and the video action recognition data, with the binary classifier model, to determine whether the video data is biased or unbiased;

wherein the one or more instructions, that cause the device to process the two or more of the text data, the image data, or the video data with the multilabel classifier model, cause the device to:

process the video tag line data, the video caption data, the video attribute data, the video transcript data, and the video action recognition data, with the multilabel classifier model and based on the video data being biased, to determine an implicit video bias.

16. The non-transitory computer-readable medium of claim 15, wherein the one or more instructions, that cause the device to utilize the plurality of video models to identify the video transcript data and the video action recognition data in the video data, cause the device to:

utilize an automatic speech recognition model to identify the video transcript data in the video data; and utilize an action recognition model to identify the video action recognition data in the video data.

17. The non-transitory computer-readable medium of claim 15, wherein the one or more instructions, that cause the device to utilize the plurality of image models to identify the image tag line data, the image caption data, and the image attribute data in the image data, cause the device to:

utilize a Paddle optical character recognition (OCR) model to identify the image tag line in the image data;

utilize a transformer-based model to identify the image caption data in the image data; and utilize a software stagewise regression network model to identify the image attribute data in the image data.

18. The non-transitory computer-readable medium of claim 14, wherein the one or more instructions further cause the device to:

identify pre-context data associated with the text data.

* * * * *